(12) United States Patent
Furuta et al.

(10) Patent No.: US 7,121,741 B2
(45) Date of Patent: Oct. 17, 2006

(54) OPTICAL COMMUNICATION MODULE

(75) Inventors: Kazumi Furuta, Akishima (JP);
Makiko Imae, Hino (JP); Yukihiro Ozeki, Fujisawa (JP)

(73) Assignee: Konica Minolta Holdings, Inc., Tokyo (JP)

( * ) Notice: Subject to any disclaimer, the term of this patent is extended or adjusted under 35 U.S.C. 154(b) by 0 days.

(21) Appl. No.: 11/256,571

(22) Filed: Oct. 21, 2005

(65) Prior Publication Data

US 2006/0088253 A1    Apr. 27, 2006

(30) Foreign Application Priority Data

Oct. 26, 2004 (JP) ............................ 2004-310815
Oct. 26, 2004 (JP) ............................ 2004-310816

(51) Int. Cl.
*G02B 6/36* (2006.01)
(52) U.S. Cl. ............................. 385/89; 385/31; 385/93
(58) Field of Classification Search .................. 385/31, 385/88–94
See application file for complete search history.

(56) References Cited

U.S. PATENT DOCUMENTS

| | | | |
|---|---|---|---|
| 5,181,265 A * | 1/1993 | Nishiwaki et al. ............ | 385/33 |
| 5,555,334 A * | 9/1996 | Ohnishi et al. ............... | 385/93 |
| 6,120,191 A * | 9/2000 | Asakura et al. ............... | 385/93 |
| 6,243,508 B1 * | 6/2001 | Jewell et al. .................. | 385/14 |
| 6,353,491 B1 * | 3/2002 | Tanaka et al. .............. | 398/139 |
| 6,433,942 B1 * | 8/2002 | Memezawa et al. ........ | 359/833 |
| 6,694,074 B1 * | 2/2004 | Schunk ......................... | 385/33 |
| 2004/0114883 A1 * | 6/2004 | Furuichi et al. .............. | 385/93 |
| 2004/0184744 A1 * | 9/2004 | Uekawa ........................ | 385/93 |
| 2004/0223705 A1 * | 11/2004 | Kropp ........................... | 385/93 |
| 2005/0013562 A1 * | 1/2005 | Tatehata et al. .............. | 385/93 |
| 2006/0051033 A1 * | 3/2006 | Tabata et al. ................. | 385/93 |

FOREIGN PATENT DOCUMENTS

JP   2003-344715 A   12/2003

* cited by examiner

*Primary Examiner*—Ellen E. Kim
(74) *Attorney, Agent, or Firm*—Frishauf, Holtz, Goodman & Chick, P.C.

(57) ABSTRACT

An echelon type diffraction structure 5a is formed on the flat optical surface of a lens 5, thereby ensuring easy designing and easy production of a diffraction structure as a microstructure. Further, the light of wavelength λ1 is applied to the diffraction structure 5a in a tilted position with respect to the optical axis of the lens 5 so that the first order diffracted light produced by the diffraction structure 5a travels along or parallel to the optical axis of the lens 5, with the result that improved light transmittance can be maintained. Further, a lens 7b is arranged between a light emitting device 7a and lens 5. Thus, the flat optical surface of the lens 5 is arranged on the side of the end face 1a of an optical fiber 1, thereby reducing the deterioration in aberration more effectively.

6 Claims, 5 Drawing Sheets

λ 1.49 μm    λ 1.31 μm

OPTICAL COMMUNICATION MODULE

This application is based on Japanese Patent Application Nos. 2004-310815 and 2004-310816 filed on Oct. 26, 2004 in Japanese Patent Office, the entire content of which is hereby incorporated by reference.

BACKGROUND OF THE INVENTION

The present invention relates to an optical communication module, mounted on the end face of an optical fiber, for receiving an optical signal transmitted via the optical fiber and transmitting an optical signal via the optical fiber.

In a conventional optical communication system by bidirectional transmission using light having different wavelengths, an optical communication module containing an optical system composed of a light receiving device, light emitting device and lens is mounted on a terminal by which a light signal is transmitted and received through an optical fiber. Using the diffraction effect by diffraction structure, the optical system of such an optical communication module separates the transmitted light from received light, whereby the image of the transmitted light from the light emitting device is formed on the optical fiber and the received light from the optical fiber is received on the light receiving device. This arrangement provides smaller size and cost reduction.

In the optical system of the conventional optical communication module disclosed in Patent Document 1, a diffraction structure is formed on one of the optical surfaces of the optical element. The transmitted light emitted from the light emitting device is allowed to pass by, without being diffracted by the diffraction structure, and reaches the end face of the optical fiber. The luminous flux emitted from the optical fiber is provided with diffraction effect by the diffraction structure so that the direction of emission is changed, and the luminous flux enters the light receiving device.

[Patent Document 1] Tokkai 2003-344715

In the optical communication module disclosed in the Patent Document 1, there is agreement between the axis of the optical fiber and the optical axis of the optical element. The transmitted light is applied in the direction perpendicular to the optical surface provided with the diffraction structure of the optical element, and the received light is emitted so as to form an angle from the optical surface provided with the diffraction structure. In such a structure, however, when the received light is emitted in the form provided with an angle by the diffraction structure, part of light may be cut off by the stepwise diffraction structure and the light transmittance may be reduced. Reduction of light transmittance may produce an error signal. Further, the end face of the optical fiber is tilted at a predetermined angle so that light reflected therefrom is not travel backward. The received light emitted from the end face of the optical fiber is tilted with respect to the axis of the optical fiber. This raises the problem of how to handle the relationship between the tilt and diffracted angle. Further, the diffraction structure is a microstructure, and therefore, its high-precision formation on the optical surface is difficult. Moreover, there is a requirement for further reducing the deterioration of the aberration of the light having passed through the optical element.

SUMMARY OF THE INVENTION

To solve the aforementioned problems involved in the conventional technique described above, an object of the present invention is to provide an optical communication module equipped with an optical element characterized by easy assembling and improved light transmittance.

The present invention provides an optical communication module for applying transmitted light to an optical fiber equipped with the end face tilted at an angle of $\theta$ with respect to the plane orthogonal to the axis; the aforementioned optical communication module comprising:

a light receiving device for receiving the light of wavelength $\lambda 1$ emitted from the end face of the aforementioned optical fiber;

a light emitting device for emitting the light of wavelength $\lambda 2$ (where $\lambda 1 \neq \lambda 2$) to be applied to the end face of the aforementioned optical fiber;

a first optical element arranged between the light receiving device/light emitting device, and the end face of the optical fiber; and a second optical element arranged between the light emitting device and first optical element;

wherein the first optical element contains a curved optical surface facing the light receiving device and light emitting device, and a flat optical surface facing the end face of the optical fiber;

wherein the aforementioned flat optical surface is provided with a diffraction structure where the amount of the 0-th order diffracted light becomes the maximum when the light of wavelength $\lambda 2$ has passed by, and the amount of the n-th order diffracted light (where "n" is an integer other than 0) becomes the maximum when the light of wavelength $\lambda 1$ has passed by; and wherein the light of wavelength $\lambda 1$ is applied to the diffraction structure in the form tilted with respect to the optical axis of the first optical element to ensure that the aforementioned n-th order diffracted light produced by the diffraction structure travels along or parallel to the optical axis of the first optical element.

Further, the tilt angle $\theta$ of the end face of the optical fiber is determined, based on the diffraction angle $\phi$ of the n-th order diffracted light in the diffraction structure.

In the optical communication module of the present invention, a diffraction structure is formed on the flat optical surface of the first optical element. This arrangement ensures easy designing and easy production of the diffraction structure as a microstructure. Further, the light of wavelength $\lambda 1$ is applied to the diffraction structure in the form tilted with respect to the optical axis of the first optical element so that the n-th order diffracted light produced by the diffraction structure travels along or parallel to the optical axis of the first optical element. This arrangement maintains improved light transmittance.

The outgoing angle of the light emitted from the end face tilted at a tilt angle $\theta$ with respect to the axis of the optical fiber is uniquely determined by the refraction index of the optical fiber material, that of air and the incoming angle to the end face, according to the Snell's law. In the meantime, there is a constant relationship between the incoming angle formed when the light emitted from the end face enters the optical surface of the optical element, and the diffraction angle $\phi$ of the n-th order diffracted light produced by the diffraction structure provided therein. For example, it is determined so that the n-th order diffracted light agrees with the optical axis of the optical element (outgoing angle is 0 degree), and the direction of the axis of the optical fiber is arranged parallel to the optical axis of the optical element. If this arrangement is used, the assembling of the optical communication module is facilitated. In this case, the relationship between the diffraction angle φ and the tilt angle θ can be determined uniquely. In other words, when the tilt angle θ of the end face is set to the predetermined value determined by the diffraction angle φ, the direction of the axis of the optical fiber can be made parallel to the optical axis of the optical element. In addition, the second optical element is arranged between the light emitting device and first optical element. When the flat optical surface of the first optical element is arranged on the side of the end face of the optical fiber, deterioration in aberration can be reduced.

Further, the tilt angle θ is preferably adjusted within the range of ±1 degree, with respect to the angle providing the highest diffraction efficiency, because an optical signal of high intensity can be obtained.

Furthermore, the diffraction structure is preferably of an echelon type formed cyclically in a predetermined direction because easy manufacturing is ensured by forming a flat optical surface. A blazed diffraction structure can also be used.

Furthermore, the first optical element is preferably made of resin since this arrangement ensures easy formation of the diffraction structure. The second optical surface is preferably made of glass because aberration characteristics are improved.

Further, the optical axis of the first optical element is tilted in the direction of the arrangement of the diffraction structure, with respect to the axis of light emitted to the end face of the optical fiber from the light emitting device. This arrangement improves the efficiency of combination between the light emitted from the light emitting device and the transmitted light of the optical fiber.

BRIEF DESCRIPTION OF THE DRAWINGS

FIG. 3 is a schematic 3D diagram showing the positional relationship among the optical fiber 1, lens 5, light receiving device 4, and light emitting device 7a.

DETAILED DESCRIPTION OF THE PREFERRED EMBODIMENTS

Figure 1:
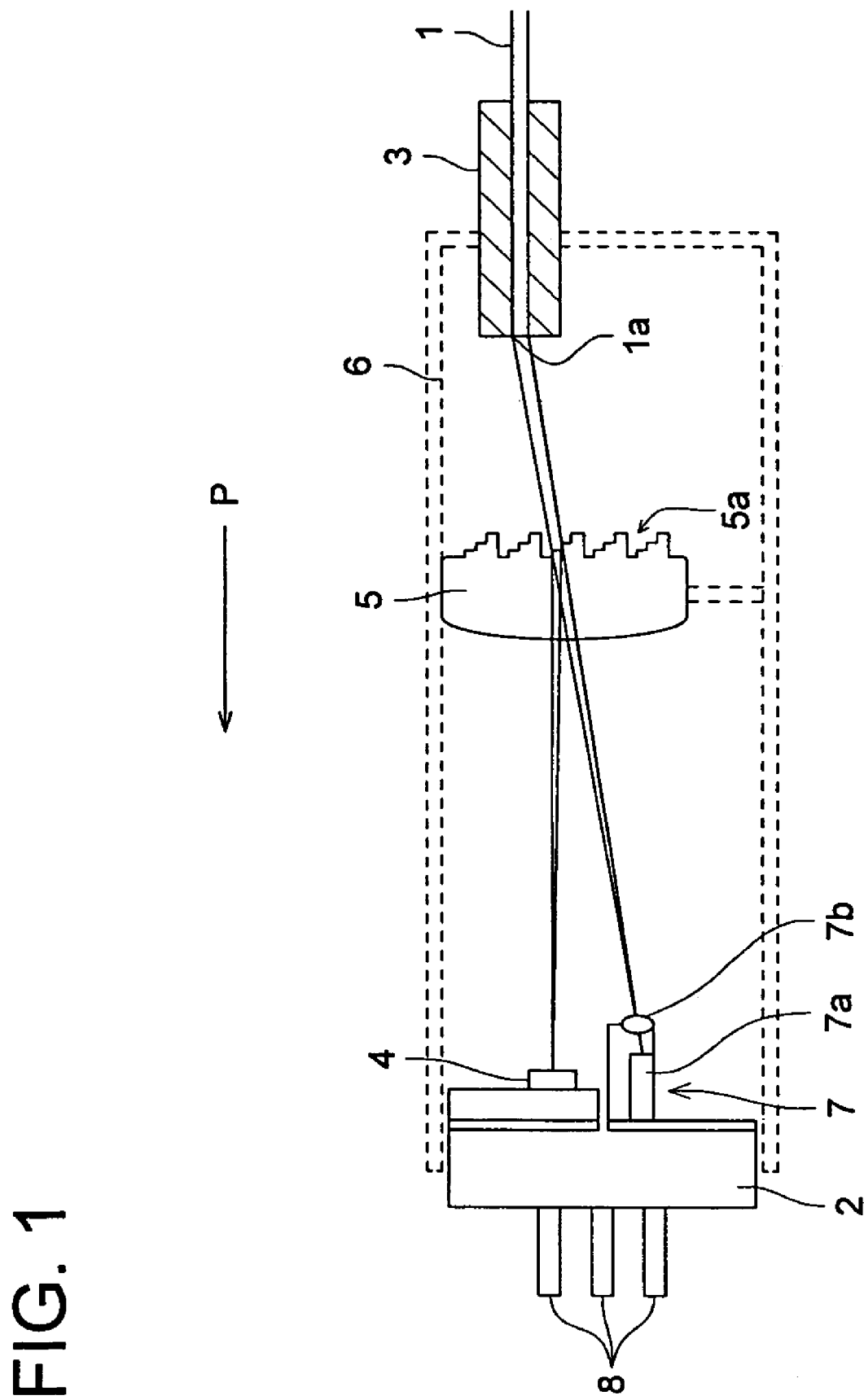
FIG. 1 is a schematic cross sectional view representing the optical communication module as the first embodiment.

The following describes the embodiments of the present invention with reference to drawings. FIG. 1 is a schematic cross sectional view representing the optical communication module as the first embodiment. It should be noted that the echelon type diffraction structure is depicted in an exaggerated form for purposes of easy understanding.

In FIG. 1, a resin-made lens 5 (first optical member) is arranged at the center of the cylindrical case 6. A hollow cylindrical holder 3 is mounted on the right-hand end of the case 6 in FIG. 1. An optical fiber 1 is inserted through the holder. The optical fiber 1 is connected to the optical communication system, whereby optical signals can be exchanged with other terminal. Received light is irradiated from to the end face 1a and emitted light enters the end face 1a. Further, a substrate 2 is mounted on the left end of the case 6 in FIG. 1. A light receiving device 4 composed of a photodiode, and a light emitting device unit 7 are arranged on the inner side of the substrate 2. The light emitting device unit 7 is composed of a light emitting device 7a as a semiconductor laser, and a glass-made lens (second optical element) 7b, which are integrated into one piece. The light receiving device 4 and light emitting device 7a linked to external terminal equipment (not illustrated) so as to permit the electrical signal to be transmitted through the connector 8 installed on the substrate 2.

Figure 2B:
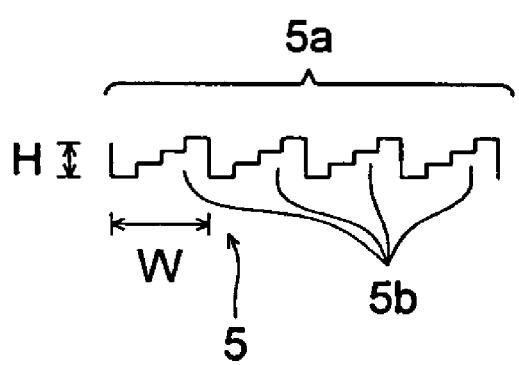
FIG. 2(b) is a cross sectional view of the lens 5 of FIG. 2(a) taken along the plane including the optical axis and vertical line (view B—B).
Figure 2A:
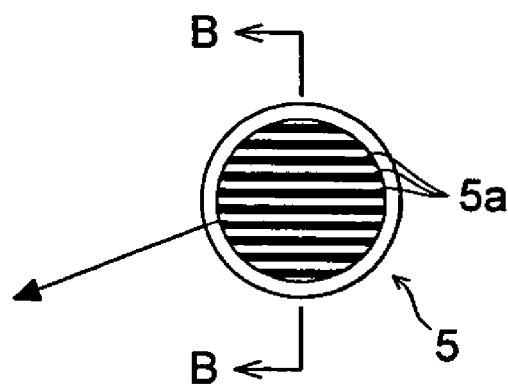
FIG. 2(a) is a view showing a lens 5 as seen from the side of the optical fiber.

FIG. 2(a) is a view showing a lens 5 as seen from the side of the optical fiber, and FIG. 2(b) is a cross sectional view of the lens 5 of FIG. 2(a) taken along the plane including the optical axis and vertical line (view B—B). The lens 5 has an aspherical optical surface on the side of the light receiving device 4 and light emitting device 7a. The optical surface on the side of the optical fiber 1 is flat, and the echelon type diffraction structure 5a is formed thereon. The echelon type diffraction structure 5a is formed of an echelon grating 5b that extends in the horizontal direction on the optical surface and repeats at regular intervals, as shown in FIG. 2(b). One of the echelon gratings 5b can be set to four steps, a total height H of 15 μm and an overall width of 38 μm.

Figure 3:
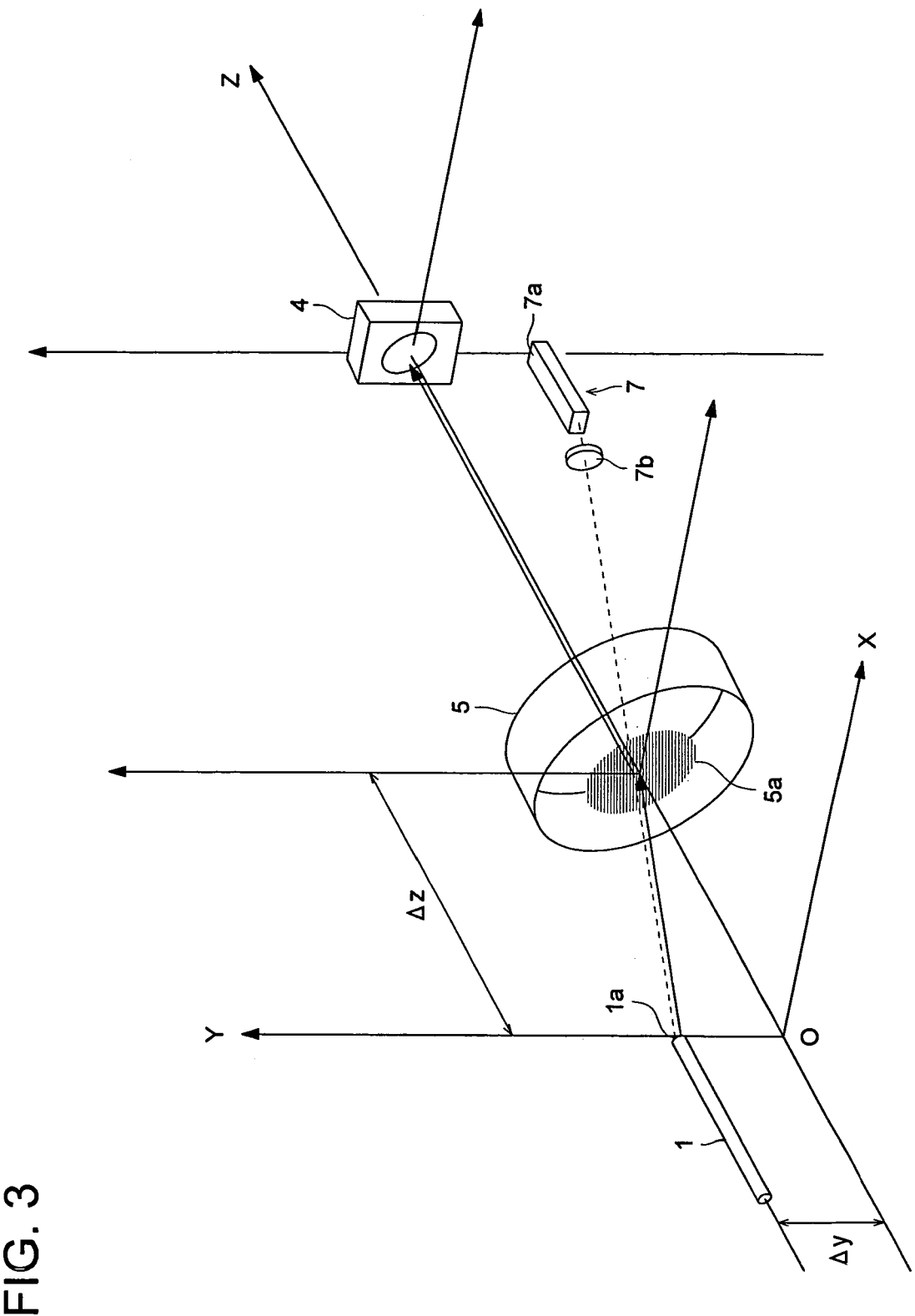

FIG. 3 is a schematic 3D diagram showing the positional relationship among the optical fiber 1, lens 5, light receiving device 4, and light emitting device 7a. In FIG. 3, the lens 5 is arranged in such a way that the optical axis thereof agrees with the Z-axis. In this case, the light receiving device 4 is arranged so that the light receiving surface is located on the Z-axis. In the meantime, the end face 1a of the optical fiber 1 is arranged +Δy away along the Y-axis (in the direction where the diffraction structure 5a is arranged) from the origin. It is located on the extension connecting between the end face 1a and the echelon type diffraction structure 5a of the lens 5. The light emitting device 7a is located at the position where a predetermined relationship of image formation is held.

When the optical communication module shown in FIGS. 1 through 3 is used for optical bidirectional communication apparatus for sending and receiving an optical signal, the laser beam having a wavelength λ2 of 1.31 μm modulated according to a predetermined signal is emitted from the light emitting device 7a, and enters the lens 5 through the lens 7b. In this case, the echelon type diffraction structure 5a is so structured that there is no diffraction effect for the light having a wavelength λ2 of 1.31 μm (namely, the amount of the 0-th order diffracted light is maximum), and therefore, the laser beam as the 0-th order diffracted light exhibits straight traveling, as shown by the dotted line. It enters the end face 1a of the optical fiber 1, and is sent to external terminal equipment through the optical fiber 1.

The light having a wavelength λ1 of 1.49 μm, for example, sent through the optical fiber 1 and emitted from the end face 1a, enters the lens 5. The echelon type diffraction structure 5a exhibits a diffraction effect for the light having a wavelength λ1 of 1.49 μm, whereby the amount of the first order diffracted light is maximized. Because of this structure, the first order diffracted light provided with an angle with respect to the incoming light as shown by the solid line and generated from the diffraction structure 5a travels along (or parallel to) the optical axis of the lens 5, and an image is formed on the light receiving surface of the light receiving device 4 so that this light is converted into electrical signals. Thus, information transmitted based on this electrical signal can be obtained. The optical communication module as a whole is stored in the case 6 and is used under lightproof conditions.

Figure 4:
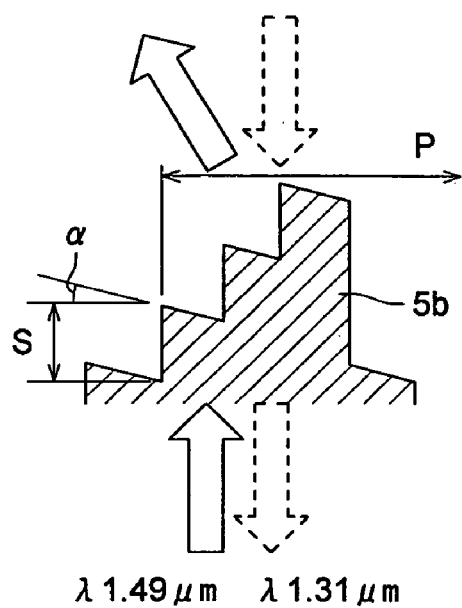
FIG. 4 is a diagram schematically showing the light passing through the echelon type diffraction structure 5a in the lens 5.
Figure 4:
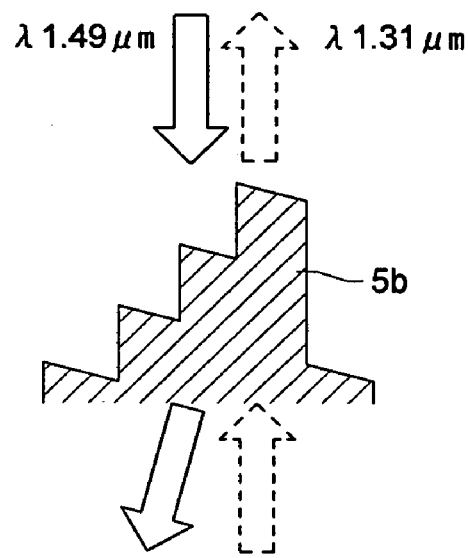
Figure 4:
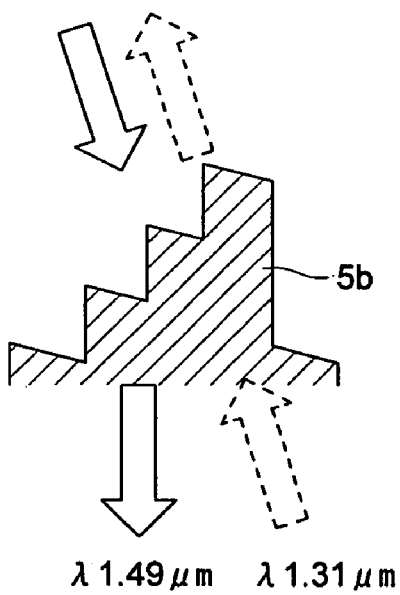

The inventors of the present invention studied the suitability of the angle of light passing through the echelon type diffraction structure 5a. FIG. 4 is a diagram schematically showing light passing through the echelon type diffraction structure in the lens 5. In this case, it is assumed that the pitch "p" of the echelon grating 5b in the echelon type diffraction structure is 26.4 μm, the height "s" of one step is 4.9 μm, and the step slope angle α is 6.5 degrees. Also it is assumed that the optical surface of the lens 5 is not coated. As shown in FIG. 4(a), light having a wavelength λ2 of 1.31 μm is made to enter the diffraction structure 5a parallel to the optical axis of the lens 5 from the side of air, and the light having a wavelength λ1 of 1.49 μm is made to enter the diffraction structure 5a parallel to the optical axis of the lens 5 from the side of the lens 5. In this case, the light transmittance (the directions of polarization of the TE and TM are orthogonal to each other) is as follows, according to the result of studies by the inventors of the present invention:

(Light Transmittance)
first order diffracted light having a wavelength λ1/TE: 72.16% and TM: 71.30%
0-th order diffracted light having a wavelength λ2/TE: 56.50% and TM: 57.28%.

Further, as shown in FIG. 4(b), the light having a wavelength λ2 of 1.31 μm is made to enter the diffraction structure 5a parallel to the optical axis of the lens 5 from the side of the lens 5, and the light having a wavelength λ1 of 1.49 μm is made to enter the diffraction structure 5a parallel to the optical axis of the lens 5 from the side of air. In this case, the light transmittance is as follows, according to the result of studies by the inventors of the present invention:

(Light Transmittance)
first order diffracted light having a wavelength λ1/TE: 65.04% and TM: 63.94%
0-th order diffracted light having a wavelength λ2/TE: 56.48% and TM: 57.28%.

Specifically, the result of the aforementioned studies by the present inventors shows that a high light transmittance can be obtained when the light having a wavelength λ1 is made to enter the diffraction structure 5a parallel to the optical axis of the lens 5 from the side of the lens, than when it is made to enter the diffraction structure 5a parallel to the optical axis of the lens 5 from the side of air. However, the structure shown in FIG. 4(a) raises a problem that it is difficult to ensure that the first order diffracted light of wavelength λ1 emitted from the diffraction structure 5a is condensed on the light receiving surface of the light receiving device 4.

As shown in FIG. 4(c), the light having a wavelength λ2 of 1.31 μm is made to enter the diffraction structure 5a obliquely with respect to the optical axis of the lens 5 from the side of the lens, the light having a wavelength λ1 of 1.49 μm is made to enter the diffraction structure 5a obliquely with respect to the optical axis of the lens 5 from the side of air, and the first order diffracted light is emitted along the optical axis. In this case, the light transmittance is as follows, according to the result of studies by the inventors of the present invention:

(Light Transmittance)
first order diffracted light having a wavelength λ1/TE: 72.17% and TM: 71.31%
0-th order diffracted light having a wavelength λ2/TE: 54.19% and TM: 53.62%.

Specifically, it has been made clear that almost the same light transmittance is obtained when the light having a wavelength λ1 of 1.49 μm is made to enter the diffraction structure 5a parallel to the optical axis of the lens 5 from the side of air, and when it is made to enter the diffraction structure 5a obliquely with respect to the optical axis of the lens 5 from the side of air and the first order diffracted light is emitted along the optical axis. According to this structure, arrangements are so made in advance that the light receiving surface of the light receiving device 4 is located in the optical axis of the lens 5, and positional relationship is adjusted so that the 0-th order diffracted light and first order diffracted light each can be condensed adequately, whereby easy assembling is ensured.

Further, the optical communication module of the present embodiment ensures easy designing and manufacturing of the diffraction structure as a microstructure if the echelon type diffraction structure 5a is formed on the flat optical surface of the lens 5. The light of wavelength λ1 is applied to the echelon type diffraction structure 5a in a tilted position with respect to the optical axis of the lens 5 so that the first order diffracted light produced by the diffraction structure 5a (second order or higher order diffracted light may be used) travels along or parallel to the optical axis of the lens 5, with the result that improved light transmittance can be maintained as described above. Further, the lens 7b is arranged between the light emitting device 7a and lens 5. The flat optical surface of the lens 5 is arranged on the side of the end face 1a of the optical fiber 1, thereby reducing the deterioration in aberration more effectively.

Figure 5:
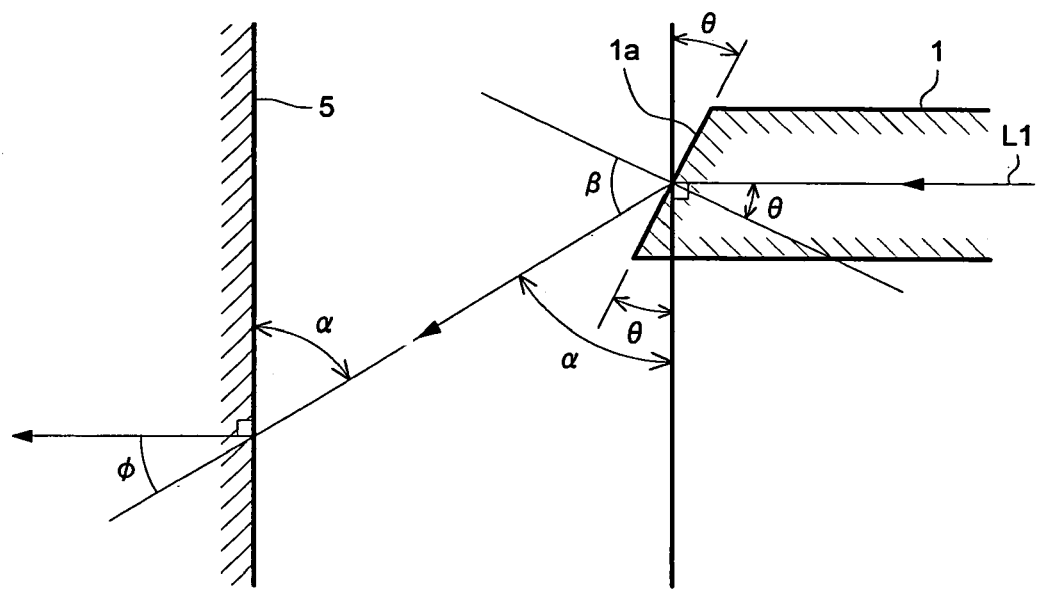
FIG. 5 is a schematic diagram showing the positional relationship between the optical fiber 1 and lens 5.

FIG. 5 is a schematic diagram showing the positional relationship between the optical fiber 1 and lens 5, wherein the diffraction structure of the lens 5 is not shown. Assumed is the case where the axis of the optical fiber 1 is parallel to the optical axis of the lens 5. In the first place, it is assumed that the end face angle on the end face 1a of the optical fiber 1 (angle of the end face 1a with respect to the axis L1 of the optical fiber 1) is θ, the diffraction angle in the diffraction structure is φ, and the tilt angle of the emitted light with respect to the vertical line is α.

$$\alpha + \phi = 90° \quad (1)$$

Assuming that the refraction index of the optical fiber material is "n", the refraction index of air is 1, the incoming angle (tilting angle) is θ based on horizontal entry of light, and outgoing angle is β, the following formula is provided by the Snell's law:

$$n \cdot \sin\theta = \sin\beta \quad (2)$$

Further, the following formula is provided by the geometric relationship:

$$\alpha - \theta + \beta = 90° \quad (3)$$

$\beta = \theta + \phi$ is obtained from formulae (1) and (3). This is substituted into formula (2) to get the following:

$$n \cdot \sin\theta = \sin(\theta + \phi)$$
$$= \sin\theta\cos\phi + \sin\phi\cos\theta$$

Further, both sides are divided by cosθ to get the following:

$$n \cdot \tan\theta = \tan\theta \cos\phi + \sin\phi$$

The above formula is transformed to get the following.

$$\theta = \tan^{-1}(\sin\phi/(n-\cos\phi)) \quad (4)$$

Formula (4) means that the end face angle θ can be expressed using the diffraction angle φ and refraction index "n" of optical fiber 1 as parameters. To be more specific, when the material of the optical fiber 1 is determined and first order diffracted light is generated in the diffraction structure 5a, the end face angle θ can be obtained if the diffraction angle φ is obtained. When this end face angle θ is secured, the axis of the optical fiber 1 and the optical axis of the lens 5 can be placed parallel to each other, and this ensures easy manufacturing.

Figure 6:
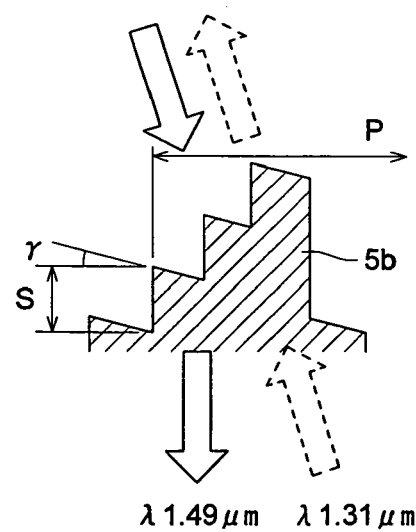
FIG. 6 is a diagram schematically showing the light passing through the echelon type diffraction structure 5a in the lens 5.

When the end face angle θ is set to the optimum value meeting the formula (4), the maximum light transmittance can be obtained. Meeting the formula (4) is not indispensable. The present inventors have examined the relationship between the end face angle θ and diffraction efficiency. As shown in FIG. 6, the pitch "p" of the echelon grating 5b in the echelon type diffraction structure is 26.4 μm, the height "s" of one step is 4.9 μm, and the step slope angle γ is 6.5 degrees, and the refraction index of the optical fiber 1 is 1.469. When the light having a wavelength λ1 of 1.49 μm is made to enter, the first order diffracted light is emitted at a diffraction angle φ of 3.235 degrees from the diffraction structure 5a.

Table 1 shows the angle between the axis of the optical fiber 1 and emitted light (90−α) and the values for the diffraction efficiency (the directions of polarization of the TE and TM are orthogonal to each other), when the light having a wavelength λ1 of 1.49 μm is made to enter the optical surface of the lens 5 by changing the end face angle θ.

TABLE 1

| θ [deg] | (90 − α) [deg] | Diffraction efficiency @ λ 1.49 μm | |
|---|---|---|---|
| | | TE | TM |
| 5 | 2.345 | 70.58% | 70.00% |
| 6 | 2.814 | 71.39% | 70.46% |
| 7 | 3.283 | 72.18% | 71.31% |
| 8 | 3.752 | 71.46% | 70.53% |

According to Table 1, even if the end face angle θ is changed within the range of ±1 degree with respect to the optimum value (7 degrees in this case), reduction in the diffraction efficiency can be kept below 1%. This arrangement permits signal transmission with the minimized error.

Further, according to the optical communication module as an embodiment of the present invention, the echelon type diffraction structure 5a is formed on the flat optical surface of the lens 5. This arrangement ensures easy designing and easy production of the diffraction structure as a microstructure. Further, the light of wavelength λ1 is applied to the diffraction structure 5a in a tilted position with respect to the optical axis of the lens 5 so that the first order diffracted light produced by the diffraction structure 5a (second order or higher order diffracted light may be used) travels along parallel to the optical axis of the lens 5, with the result that improved light transmittance can be maintained as described above. Further, the lens 7b is arranged between the light emitting device 7a and lens 5. The flat optical surface of the lens 5 is arranged on the side of the end face 1a of the optical fiber 1, thereby reducing the deterioration in aberration more effectively.

The present invention has been described with reference to the embodiment of the present invention. It is to be expressly understood, however, that the present invention is not restricted thereof. The present invention can be embodied in many variations with appropriate modification or additions.

What is claimed is:

1. An optical communication module comprising:
   an optical fiber having an end face inclined at a tilt angle θ with respect to a plane perpendicular to an axis of the optical fiber;
   a light receiving device to receive light of wavelength λ1 emitted from the end face of the optical fiber;
   a light emitting device to emit light of wavelength λ2 (λ1≠λ2) to allow the light to enter the end face of the optical fiber;
   a first optical element positioned between the light receiving device as well as the light emitting device and the end face of the optical fiber;
   a second optical element positioned between the light emitting device and the first optical element;
   wherein the first optical element has a curved optical surface facing the light receiving device and facing the light emitting device, and the first optical element also has a flat optical surface facing the end face of the optical fiber;
   wherein a diffraction structure is formed on the flat optical surface such that when the light of wavelength λ2 passes through the diffraction structure, zero-th order diffraction light has a largest quantity of light, and when the light of wavelength λ1 passes through the diffraction structure, n-th order diffraction light has a largest quantity of light ("n" is an integer excluding zero) and;
   wherein the light of wavelength λ1 enters the diffraction structure in the state of being inclined with respect to an axis of the first optical element such that the n-th order diffraction light generated in the diffraction structure travels along or parallel to the axis of the first optical element.

2. The optical communication module of claim 1, wherein the tilt angle θ of the end face of the optical fiber is determined based on a diffraction angle φ of n-th order diffraction light generated in the diffraction structure.

3. The optical communication module of claim 1, wherein the tilt angle θ is adjusted within a range of ±1 degree of an angle exhibiting highest diffraction efficiency.

4. The optical communication module of claim 1, wherein the diffraction structure is an echelon type diffraction structure having cyclic grating lines in a predetermined direction.

5. The optical communication module of claim 1, wherein the first optical element is made of resin and the second optical element is made of glass.

6. The optical communication module of claim 1, wherein the optical axis of the first optical element is inclined toward a direction in which grating lines of the diffraction structure are arranged side by side, with respect to an axis of light emitted from the light emitting device toward the end face of the optical fiber.

* * * * *